(12) United States Patent
Huber et al.

(10) Patent No.: US 8,396,282 B1
(45) Date of Patent: *Mar. 12, 2013

(54) METHOD AND SYSTEM FOR COMPUTING FUSED SALIENCY MAPS FROM MULTI-MODAL SENSORY INPUTS

(75) Inventors: David J Huber, Venice, CA (US); Deepak Khosla, Camarillo, CA (US); Paul Alex Dow, Los Angeles, CA (US)

(73) Assignee: HRL Labortories, LLC, Malibu, CA (US)

( * ) Notice: Subject to any disclaimer, the term of this patent is extended or adjusted under 35 U.S.C. 154(b) by 1167 days.

This patent is subject to a terminal disclaimer.

(21) Appl. No.: 12/262,548

(22) Filed: Oct. 31, 2008

(51) Int. Cl.
*G06K 9/00* (2006.01)
*G05B 15/00* (2006.01)

(52) U.S. Cl. .......... 382/153; 381/56; 700/258; 382/103; 382/154

(58) Field of Classification Search .................. None
See application file for complete search history.

(56) References Cited

U.S. PATENT DOCUMENTS

| | | | |
|---|---|---|---|
| 4,990,838 A | 2/1991 | Kawato et al. | |
| 5,498,943 A | 3/1996 | Kimoto et al. | |
| 7,499,894 B2 | 3/2009 | Marom et al. | |
| 2009/0018696 A1* | 1/2009 | Goerick et al. | 700/245 |
| 2009/0175595 A1* | 7/2009 | Le Meur et al. | 386/96 |

OTHER PUBLICATIONS

Asfour et al. (Dec. 2006) "ARMAR-III: An integrated humanoid platform for sensory-motor control." Proc. 2006 IEEE-RAS Int'l Conf. on Humanoid Robots, pp. 169-175.*
Huber et al. (2009) "Fusion of multi-sensory saliency maps for automated perception and control." Proc. SPIE vol. 7336.*
Itti et al. (Jan. 2001) "Feature combination strategies for saliency-based visual attention systems." J. Electronic Imaging, vol. 10 No. 1, pp. 161-169.*
Khosla et al. (2009) "Biologically-inspired robust and adaptive multi-sensor fusion and active control." Proc. SPIE vol. 7345.*
Khosla et al. (2009) "3d hierarchical spatial representation and memory of multimodal sensory data." Proc. SPIE vol. 7345.*
Schauerte et al. (2011) "Multimodal saliency-based attention for object-based scene analysis." Proc. 2011 IEEE/RSJ Int'l Conf. on Intelligent Robots and Systems, pp. 1173-1179.*
Goerick et al., "Towards incremental hierarchical behavior generation for humanoids." Proc. 2007 $7^{th}$ IEEE-RAS Int'l Conf. on Humanoid Robots, pp. 248-255.*
U.S. Appl. No. 12/228,579 "Saccadic Tracking for an Electro-Mechanical System", N. Srinivasa, et. al, Application & Office Actions.
Itti, L and C. Koch. A saliency-based search mechanism for overt and covert shifts of visual attention. Vision Research, 40: 1489-1506, 2000.
Itti, L., C. Koch, and E. Niebur. A Model of Saliency-Based Visual Attention for Rapid Scene Analysis. IEEE Transactions on Pattern Analysis and Machine Intelligence, 20, 1254-1259, 1998.

(Continued)

*Primary Examiner* — Barry Drennan
(74) *Attorney, Agent, or Firm* — George R. Rapacki; Daniel R. Allemeier

(57) ABSTRACT

The present disclosure describes a fused saliency map from visual and auditory saliency maps. The saliency maps are in azimuth and elevation coordinates. The auditory saliency map is based on intensity, frequency and temporal conspicuity maps. Once the auditory saliency map is determined, the map is converted into azimuth and elevation coordinates by processing selected snippets of sound from each of four microphones arranged on a robot head to detect the location of the sound source generating the saliencies.

17 Claims, 10 Drawing Sheets

Overview of Method of Fusing Saliency Maps

OTHER PUBLICATIONS

Navalpakkam, V., and L Itti. An integrated model of top-down and bottom-up attention for optimal object detection, In: Proc. IEEE Conference on Computer Vision and Pattern Recognition (CVPR), 1-7, 2006.

Orabona, E., G. Metta, and G. Sandini. Object-based Visual Attention: A Model for a Behaving Robot. In 3rd International Workshop on Attention and Performance in Computational Vision (in CVPR 2005), San Diego, CA, Jun. 2005.

Zhong, J. and Luo, S. (2006) A Model of Space and Object-based Attention for Visual Saliency. Proceedings of the First International Conference on Innovative Computing, Information, and Control (ICICIC '06).

Khosla, D., C. Moore, D. Huber, S. Chelian. Bio-inspired visual attention and object recognition, Proc. SPIE 6560, 2007.

Kayser, Christoph, Christopher I. Petkov, Michael Lippert, and Nikos K. Logothetis, Mechanisms for Allocating Auditory Attention: An Auditory Saliency Map, Current Biology, vol. 15, 1943-1947, 2005.

Strutt, J. W. ,On Our Perception of Sound Direction, Phil. Mag, vol. 13, 214-232, 1907.

Zurek, P.M., A Note on Onset Effects in Binaural Hearing. J Acoust Soc. Am., vol. 93(2), 1200-1201, 1993.

Martin, K.D., A Computational Model of Spatial Hearing, Master's Thesis, Massachusetts Institute of Technology, 1995.

Ruesch, Jonas , Manuel Lopes, Alexandre Bernardino, Honas Hornstein, Jose Santos-Victor, Rolf Pfeifer. Multimodal Saliency Based Bottom Up Attention a Framework for the Humanoid Robot iCub, IEEE International Conference on Robotics and Automation, Pasadena, CA. USA, May 19-23, 2008.

Kumar, Praveen, Ankush Mittal and Padam Kumar Study of Robust and Intelligent Surveillance in Visible and Multimodal Framework, Informatica 32, 2008, pp. 63-77.

Hornstein, Jonas, Manuel Lopes, Jose Santos-Victor Sound Localization for Humanoid Robots—Building Audio-Motor Maps based on the HRTF, Proceedings of the 2006 IEEE/RSJ International Conference on Intelligent Robots and Systems Oct. 9-15, 2006, Beijing, China.

* cited by examiner

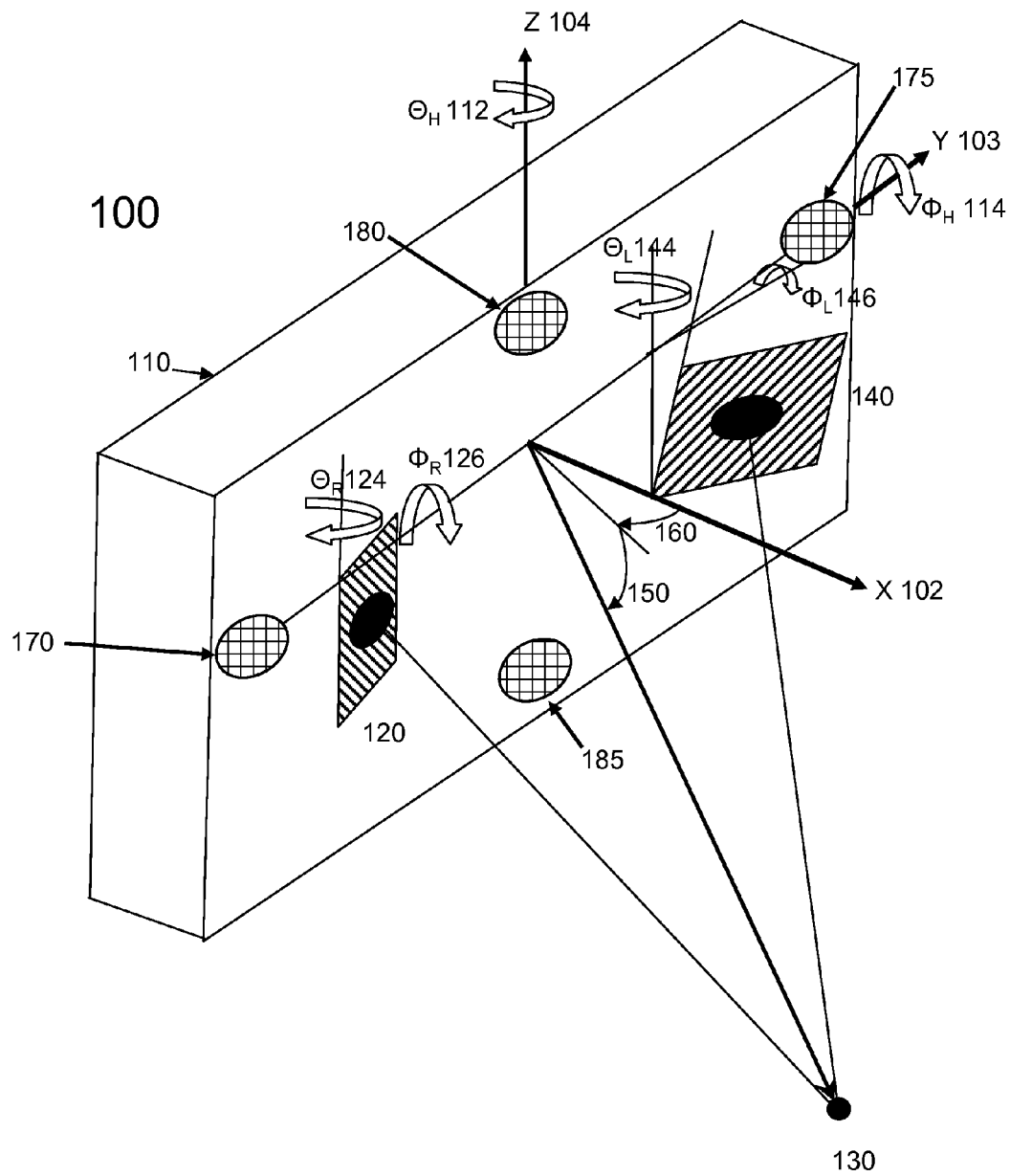
Figure 1 Robot Eyes, Head and Body Relationships

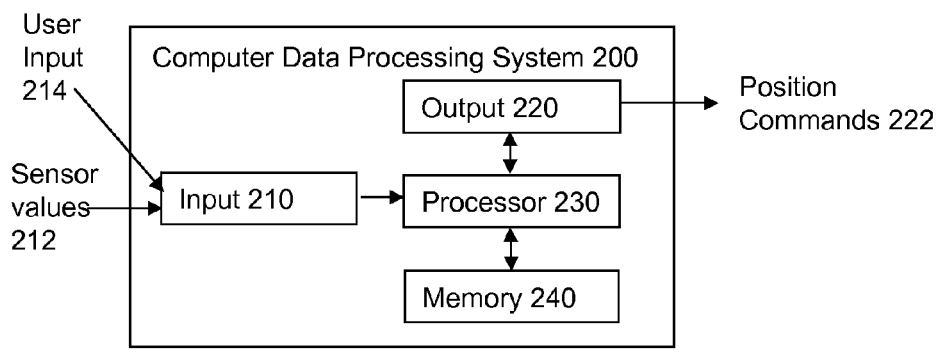
Figure 2 Robot Computer
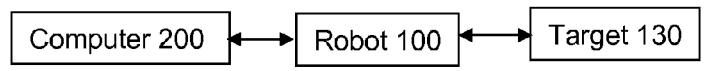
Figure 3 Robot System
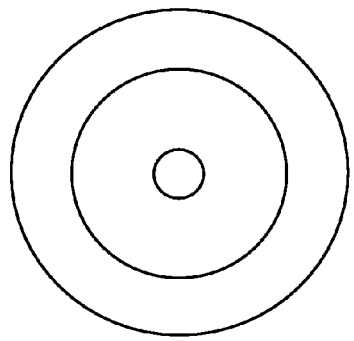
Figure 4 Computer Program Product on Compact Disk or other medium

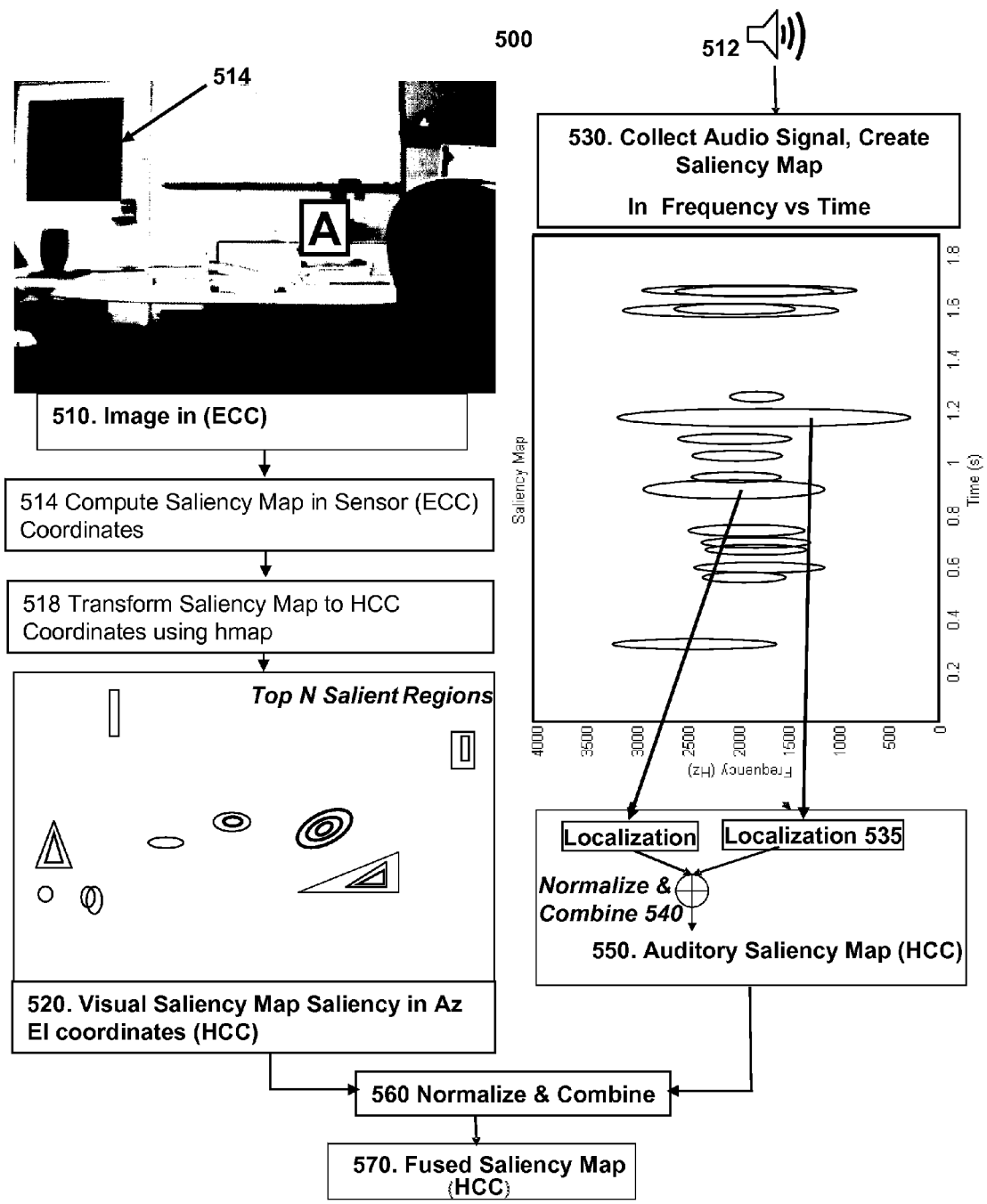
Figure 5 Overview of Method of Fusing Saliency Maps

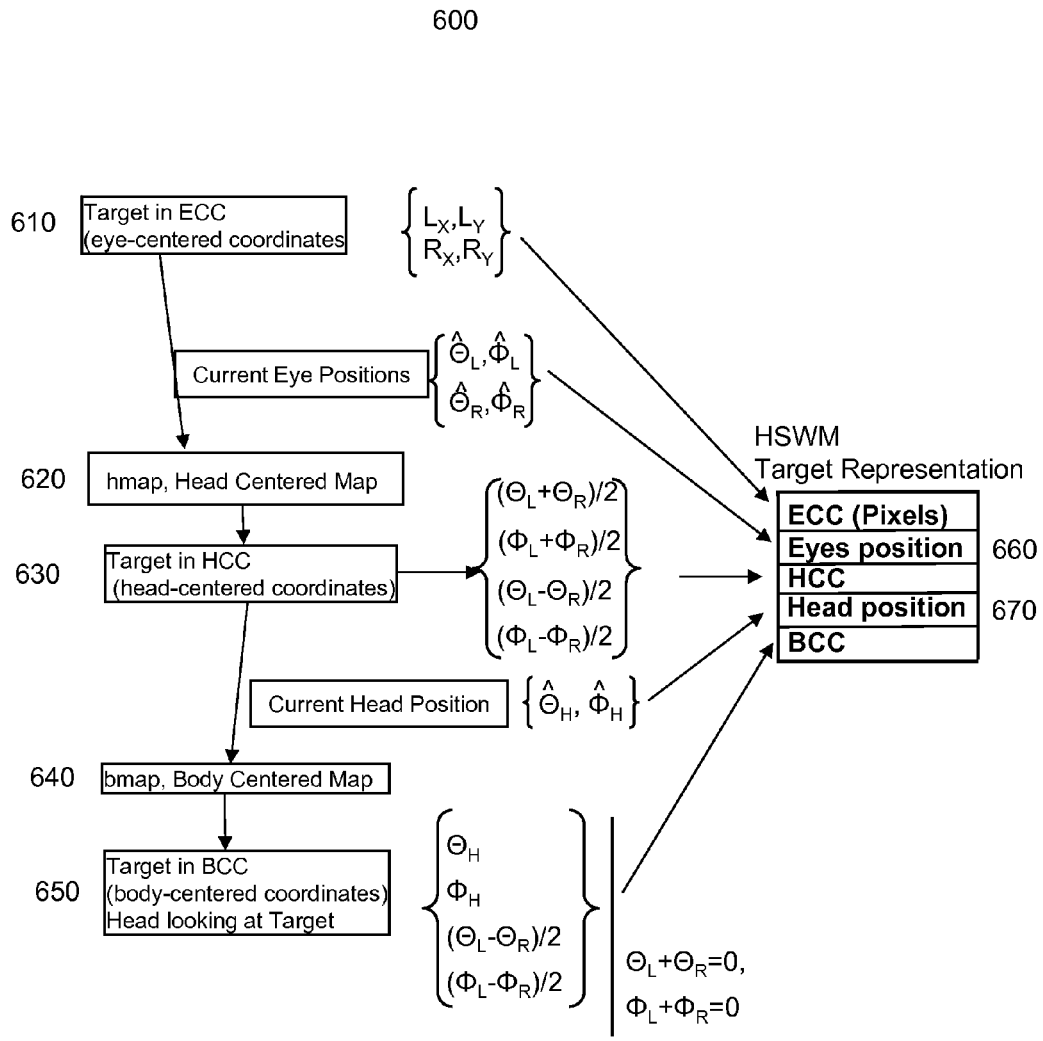
Figure 6: Hierarchical Spatial Working Memory.

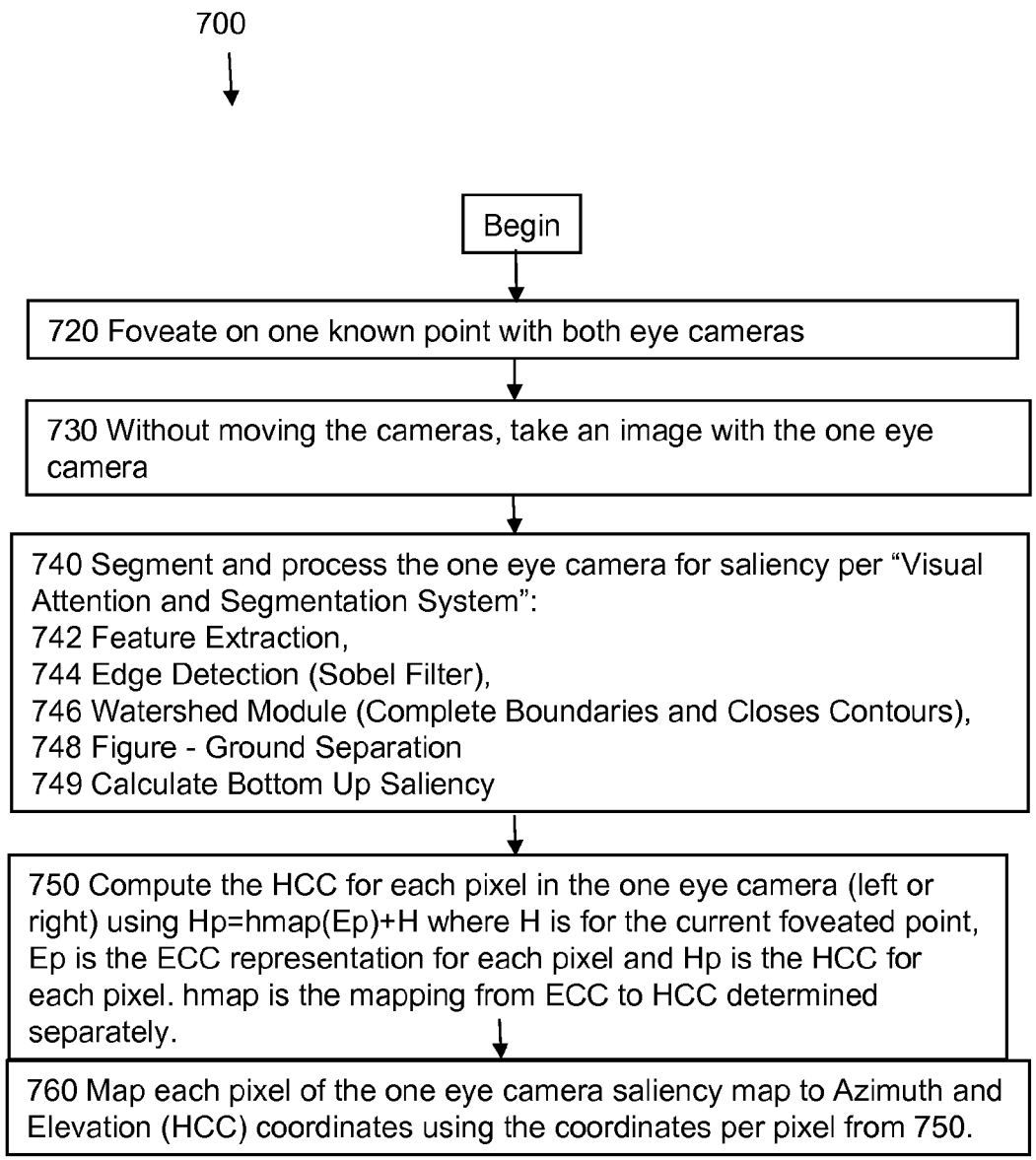
Figure 7 Creation of Visual Saliency Map

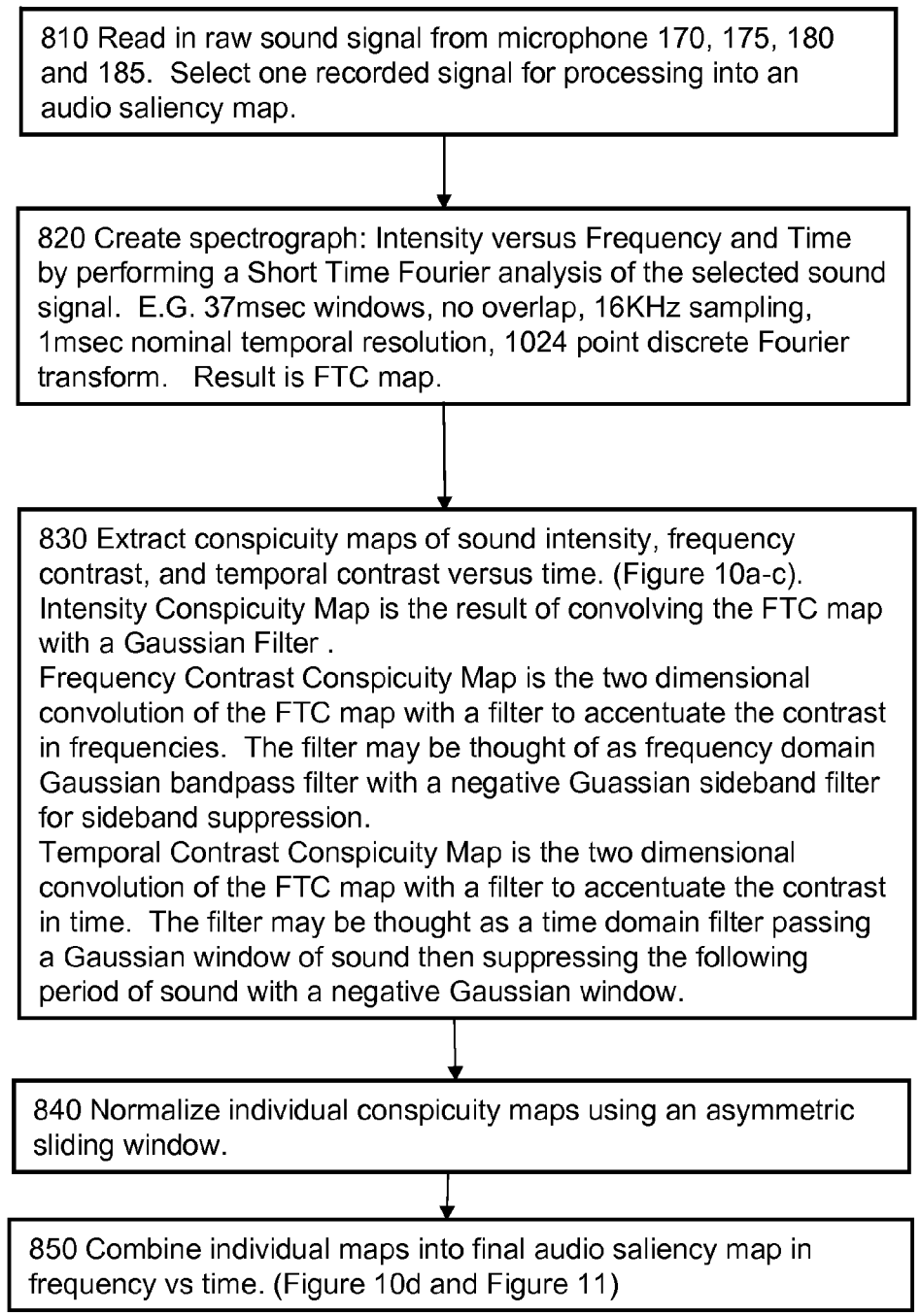
Figure 8 Creation of Audio Saliency Map

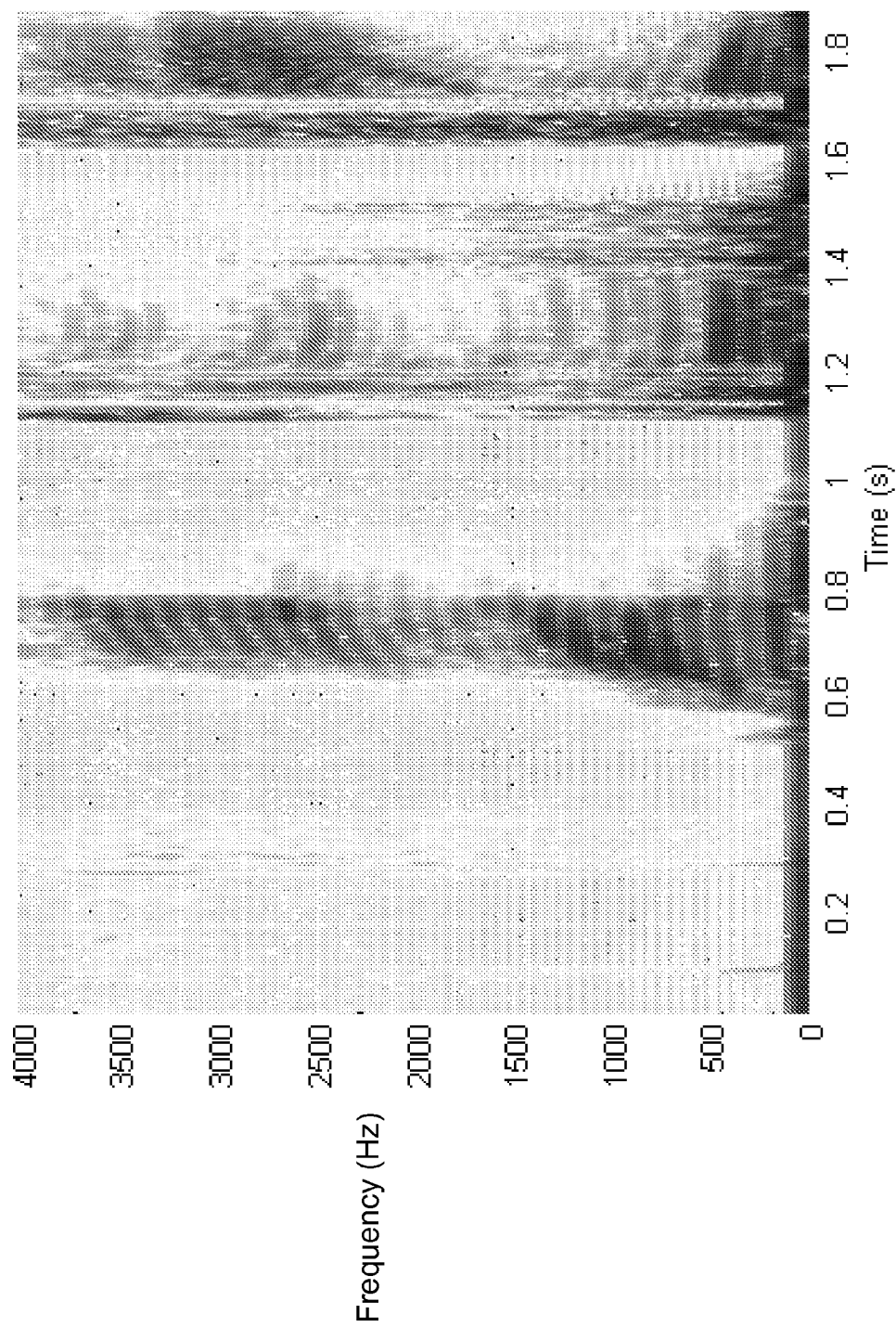

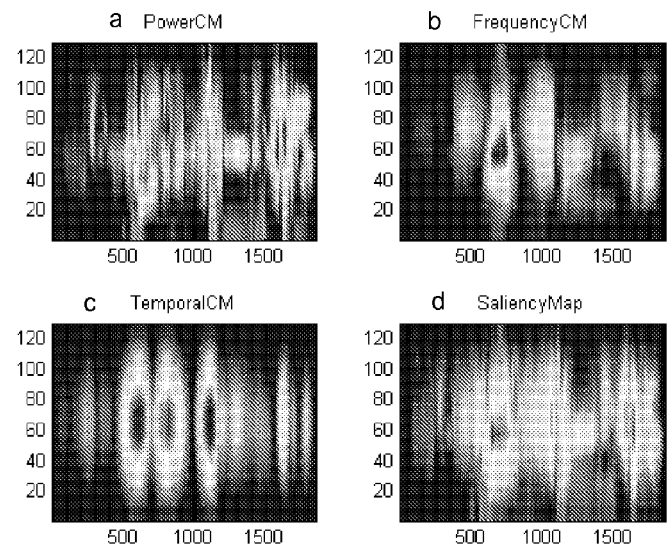
Figure 10 Intermediate Conspicuity Maps (CM) of Power, Frequency Contrast, and Temporal Contrast
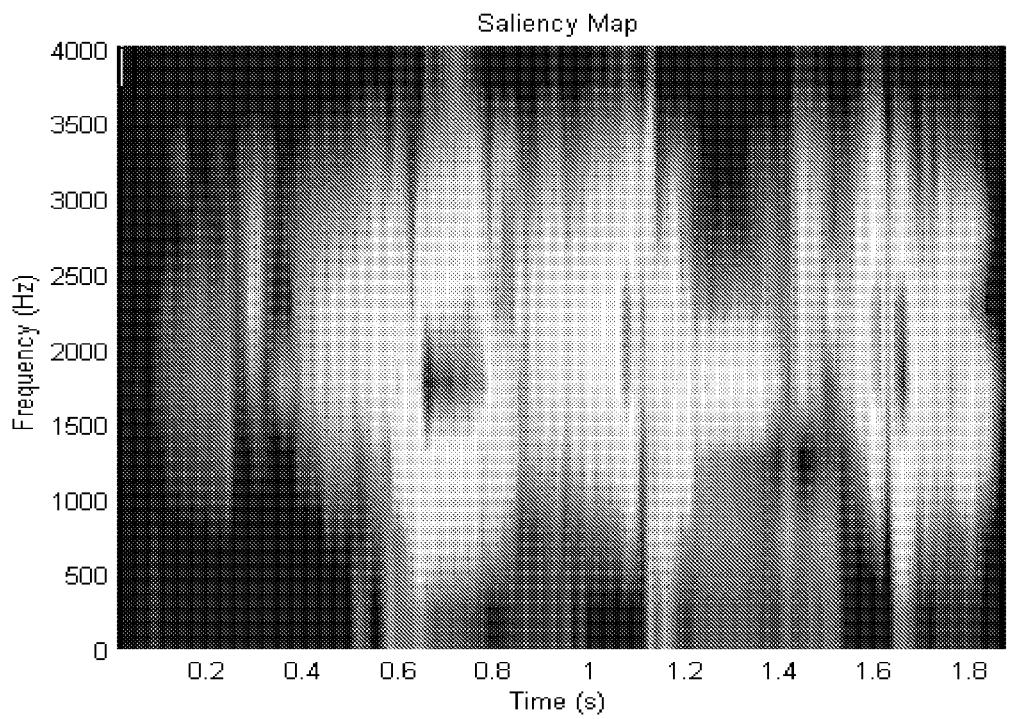
Figure 11 Final Audio Saliency Map 1210 Segment the Audio Saliency map in time and frequency by windowing the local maxima with a rectangular window that bounds the spectra by a user defined amount. For each local maxima, generate time and frequency bands of interest bracketing signal peaks. i.e. each peak has a time bracket and a frequency bracket 1220 For each time band create audio snippets by extracting the audio signal within the time band from the Left, Right, Upper and Lower Audio signals. Decimate the Left, Right, Upper and Lower Audio Signals by bandpass filtering each audio signal in the frequency domain with the frequency band. Result is a snippet of audio for each microphone for each signal peak specific to the time and frequency band of the saliency map peaks.

1230 Process the snippets to eliminate echoes, noise and other anomolies

1240 For the Upper and Lower snippets, calculate the onset envelope of the signals over the start and stop times
The onset envelope bounds the audio snippets of each microphone.
Onsets occur where the audio signal exceeds the decayed local maxima.
Repeat for the Left and Right snippets.

1250 For each enveloped snippet, Upper and Lower, find and save the onsets of the envelope. Convert the onsets to weighted Kronecker delta functions starting at the minimum time. Inhibit the occurrence of a Kronecker delta function until at least 10 milliseconds have elapsed from the preceding Kronecker delta function. The result is a time series onset signal represented by weighted Kronecker delta functions for each microphone for each signal peak in the Audio Saliency Map. The weights are the changes in amplitude of the onset envelope of the audio signal at that time.

1260 Calculate the Azimuth Interaural Time Difference by cross correlating the Left and Right sets of onset signals. The largest value represents the sound source, the time of occurrence is the ITD.

(Continued on Figure 12B, following page)

Figure 12A  Localization of Audio Sources

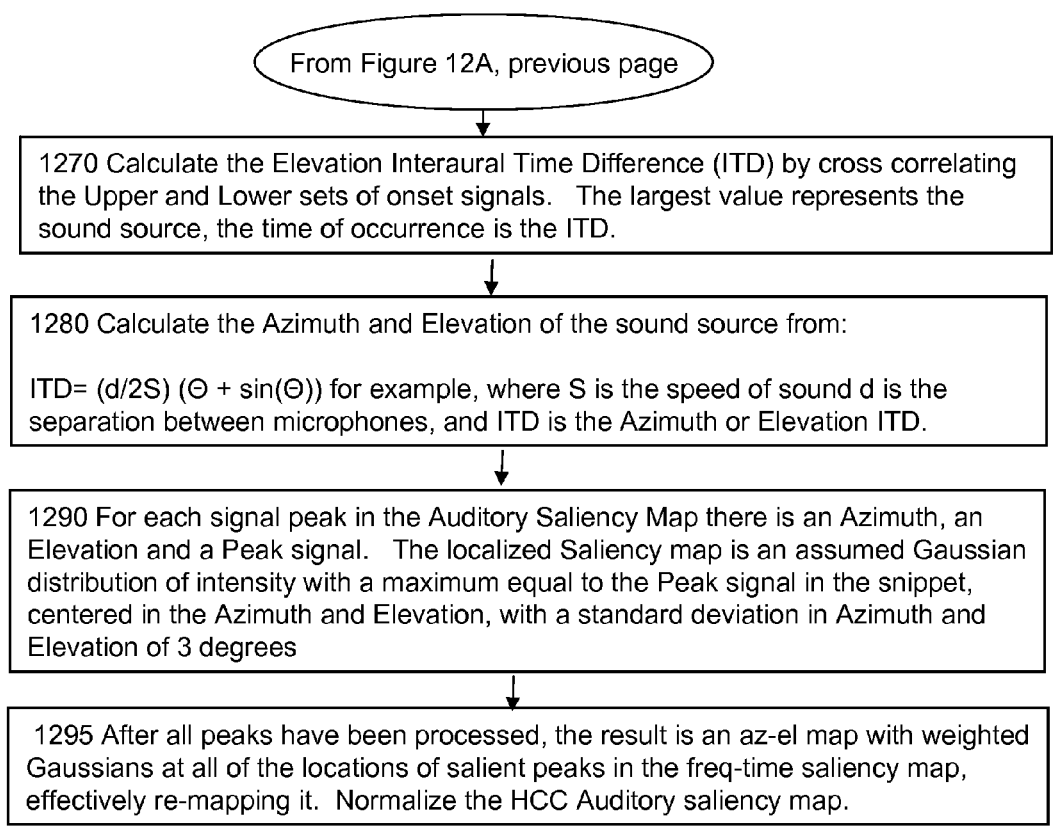
Figure 12B Localization of Audio Sources (Concluded)
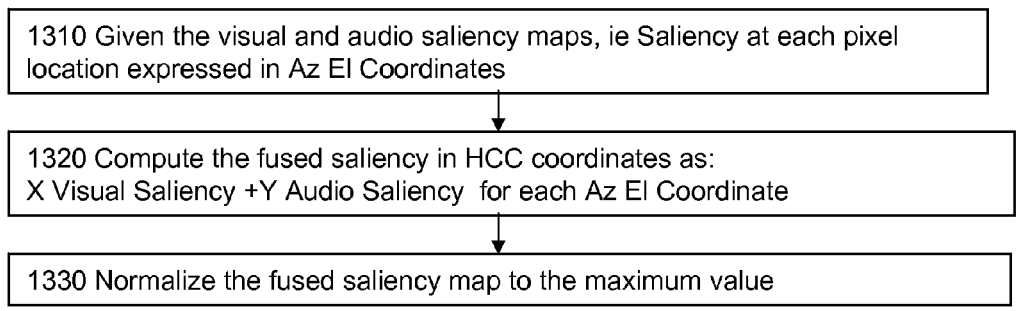
Figure 13 Saliency Map Fusion

METHOD AND SYSTEM FOR COMPUTING FUSED SALIENCY MAPS FROM MULTI-MODAL SENSORY INPUTS

RELATED APPLICATIONS

This application is related to "Visual Attention and Object Recognition System" application Ser. No. 11/973,161 filed 4 Oct. 2007 Visual Attention and Segmentation System" application Ser. No. 12/214,259 filed 16 Jun. 2008, "Hierarchical Spatial Representation for Multimodal Sensory Data" application Ser. No. 12/192,918 filed Aug. 15, 2008 herein incorporated by reference in their entirety.

BACKGROUND

This invention describes a method and apparatus for combining visual and auditory saliency maps into a format that is usable by a robotic agent.

The invention allows identification of high saliency targets where the targets originate from optical or auditory sensors. Each sensor's data can be independently processed into a saliency map. The methods and apparatus described herein allow fusion of the independent saliency maps into a single, fused multimodal saliency map that is represented in a common coordinate system. This fused saliency map can then be used to determine the most salient targets as well as for subsequent active control of a hardware or device.

It is well known that there is an initial stimulus-driven mechanism that provides weighted representations of sensory scenes, biasing perception toward salient stimuli, i.e., those which are more likely to attract attention or which will be easier to detect. This mechanism postulates that some features in a scene are conspicuous based on their context and, hence, are salient, and thus attract attention; for example, red car on a highway or a police car's siren amid the rush-hour's noise.

The concept of saliency maps has been proposed [1-6] to explain the mechanisms underlying the selection of salient stimuli. These saliency maps employ the hierarchical and parallel extraction of different features and build on existing understanding of sensory processing. For the visual system, such models were shown to replicate several properties of human overt attention [1-4]. More recently, such models have also been proposed for the auditory system [6]. Each of these methods produces a saliency map that employs a coordinate system that makes sense for the modality of the sensor; the visual saliency map represents the visual space in pixels (camera/eye coordinates), while the auditory saliency map employs a frequency-time coordinate space. In addition, saliency typically includes the concept of a priority and queuing. As a result, some auditory saliency maps in the prior art [10] typically will have difficulty processing multiple targets because the map does not include priority or queuing.

Before targets can be selected based on saliency, the targets in each type of map have to be combined into one map and their saliency in that mapping determined. There is a need for a method to combine various saliency maps into one such that targets of interest can be identified and prioritized.

This invention describes a computer program product and method for finding salient regions using visual and auditory sensors, determining the saliency of targets in each sensor's space, then fusing the separate saliency maps into one. This single, multi-modal saliency map uses a common coordinate system and can be used to determine primary and secondary foci of attention as well as for active control of a hardware/device. Such a fused saliency map and associated methods would be useful for robot-based applications in a multi-sensory environment.

LIST OF CITED LITERATURE REFERENCES

The following references are hereby incorporated by reference as though fully included herein. The references are cited in the application by referring to the associated number.
1. L. Itti and C. Koch. A saliency-based search mechanism for overt and covert shifts of visual attention. *Vision Research*, 40: 1489-1506, 2000.
2. L. Itti, C. Koch, and E. Niebur. A Model of Saliency-Based Visual Attention for Rapid Scene Analysis. *IEEE Transactions on Pattern Analysis and Machine Intelligence*, 20, 1254-1259, 1998.
3. V. Navalpakkam, and L. Itti. An integrated model of top-down and bottom-up attention for optimal object detection, In: *Proc. IEEE Conference on Computer Vision and Pattern Recognition (CVPR)*, 1-7, 2006.
4. E. Orabona, G. Metta, and G. Sandini. Object-based Visual Attention: A Model for a Behaving Robot. In $3^{rd}$ *International Workshop on Attention and Performance in Computational Vision (in CVPR 2005)*, San Diego, Calif., June 2005.
5. D. Khosla, C. Moore, D. Huber, S. Chelian. Bio-inspired visual attention and object recognition, *Proc. SPIE* 6560, 2007.
6. Christoph Kayser, Christopher I. Petkov, Michael Lippert, and Nikos K. Logothetis, Mechanisms for Allocating Auditory Attention: An Auditory Saliency Map, *Current Biology*, Vol. 15, 1943-1947, 2005.
7. J. W. Strutt. On Our Perception of Sound Direction, *Phil. Mag*, Vol. 13, 214-232, 1907.
8. P. M. Zurek. A Note on Onset Effects in Binaural Hearing. *J Acoust Soc. Am.*, Vol 93(2), 1200-1201, 1993.
9. K. D. Martin. A Computational Model of Spatial Hearing, *Master's Thesis, Massachusetts Institute of Technology*, 1995.
10. Jonas Ruesch, Manuel Lopes, Alexandre Bernardino, Honas Hornstein, Jose Santos-Victor, Rolf Pfeifer. Multimodal Saliency Based Bottom Up Attention A Framework for the Humanoid Robot iCub, *IEEE International Conference on Robotics and Automation*, Pasadena, Calif. USA, May 19-23, 2008.

SUMMARY

FIG. 5 shows an overview of the invention that generates fused, multimodal saliency map from multiple sensory inputs. While only visual and auditory inputs are shown in FIG. 5, the concept is extensible to other sensory inputs, including without limitation olfactory, somatosensory, laser radar, radar, sonar, and millimeter wave imaging.

As seen in FIG. 5, sensory inputs in the form of images 510 and sound 512 are presented to the system 500. These inputs are overlapping in both spatial and temporal dimensions. For example, in the image on the left there is a speaker 514 in the left of the image that is being used to play sound sources (e.g., a human speech segment) while the entire visual scene is being captured by a binocular camera system mounted on a robot head system.

The visual image from one eye camera is processed into a visual saliency map 520. The auditory recording from one microphone is processed into an auditory saliency map 530 in frequency versus time coordinates. The saliency maps then go through subsequent processing to transform them into a common, head centered coordinate system. For the visual saliency map, the salient points are transformed into the head centered coordinate (HCC) system using the mapping from eye centered coordinates to head centered coordinates (hmap) developed in application Ser. No. 12/192,918 filed Aug. 15, 2008 "Hierarchical Spatial Representation for Multimodal Sensory Data. For the auditory saliency map, the salient points are localized in 540 by processing pairs of auditory recordings to convert the frequency versus time coordinates into head centered coordinates and normalizing.

The common representation maps are then combined and normalized 560 into a single, fused saliency map 570.

In a first embodiment the invention consists of a computer program product for computing a fused saliency map derived from visual and auditory sensors, the computer program product comprising a computer-readable medium having computer program instructions stored therein for causing at least one computer to perform operations of: computing a first saliency map from data generated by visual sensors; computing a second saliency map in frequency versus time coordinates from data generated by auditory sensors; localizing one or more salient peaks in the second saliency map in azimuth and elevation; constructing an auditory saliency map in azimuth-elevation coordinates by assigning the largest auditory sensor signal for each salient peak in the second saliency map to a weighted distribution centered at the previously calculated azimuth and elevation with a standard deviation; fusing the first and auditory saliency maps as a weighted combination of each, into a fused saliency map, then normalizing the fused saliency map.

In a second embodiment, the invention of the first embodiment further comprising computer program instructions to perform localization operations of: determining a frequency and time band for each salient peak of the second saliency map; extracting a snippet of sound from each auditory sensor based on the frequency and time band for each salient peak; filtering the snippets of sound to remove echoes and noise; reducing each filtered snippet of sound into an onset envelope signal; converting each onset envelope to a series of weighted Kronecker delta functions; calculating an azimuth Interaural Time Difference by cross correlating corresponding weighted Kronecker Delta functions for each salient peak; calculating an azimuth angle for each salient peak from the azimuth Interaural Time Differences; calculating an elevation Interaural Time Difference by cross correlating corresponding weighted Kronecker delta functions for each salient peak calculating an elevation angle for each salient peak from the elevation Interaural Time Difference.

In a third embodiment, the invention of the first embodiment where the distribution is a Gaussian distribution.

In a fourth embodiment, a computer program product for computing an auditory saliency map in spatial coordinates from auditory sensor data, the computer program product comprising a computer-readable medium having computer program instructions stored therein for causing at least one computer to perform operations of: computing a first saliency map in frequency versus time coordinates from data generated by the auditory sensors; localizing one or more salient peaks in the first saliency map in azimuth and elevation; constructing an auditory saliency map in azimuth-elevation coordinates by assigning the largest auditory sensor signal for each salient peak centered at the previously calculated azimuth and elevation coordinates to a Gaussian distribution with a standard deviation; normalizing the auditory saliency map.

In a fifth embodiment where the previously described fourth embodiment computer program product has computer program instructions for localizing one or more salient peaks wherein the localization comprises instructions for: determining a frequency and time band for each of one or more salient peak of the first saliency map; extracting a snippet of sound from each auditory sensor based on the frequency and time band for each salient peak; filtering the snippets of sound to remove echoes and noise; reducing each filtered snippet of sound into an onset envelope signal; converting the onset envelope to a series of weighted Kronecker delta functions for each salient peak; calculating an azimuth Interaural Time Difference by cross correlating corresponding weighted Kronecker Delta functions for each snippet of sound; calculating an azimuth angle for each salient peak from the azimuth Interaural Time Differences; calculating an elevation Interaural Time Difference by cross correlating corresponding weighted Kronecker delta functions for each salient peak; calculating an elevation angle for each salient peak from the elevation Interaural Time Difference.

In a sixth embodiment a system for robot control comprising: a first eye camera, a second eye camera, at least an upper auditory sensor, a lower auditory sensor, a left auditory sensor and a right auditory sensor, all mounted on a robot head and all providing data to at least one computer; wherein the robot head has a head centered coordinate system; the at least one computer programmed to execute instructions stored on a computer readable medium for causing the computer to perform operations of: receive said first eye camera, second eye camera, left and right auditory sensors, upper and lower auditory sensors data; and compute a visual saliency map from the first eye camera and second eye camera data in the head centered coordinate system; compute an auditory saliency map in head centered coordinates from the upper, lower, left and right auditory sensor data; fuse the visual and auditory saliency maps according to a weighting function.

In a seventh embodiment, the system for robot control previously described in the sixth embodiment wherein the computer readable medium further comprises instructions for causing the computer to command the robot head to focus on salient objects as determined by computer program inputs.

In an eighth embodiment the system for robot control previously described in the sixth embodiment wherein the computer readable medium further comprises instructions stored for causing the computer to compute the auditory saliency map by performing operations of: computing a second saliency map in frequency versus time coordinates from data generated by said auditory sensors; determining a frequency and time band for each salient point of the second saliency map; extracting a snippet of sound from each auditory sensor based on the frequency and time band for each salient peak; filtering the snippets of sound to remove echoes and noise; reducing each filtered snippet of sound into an onset envelope signal; converting the onset envelope to a series of weighted Kronecker delta functions; calculating an azimuth Interaural Time Difference by cross correlating corresponding weighted Kronecker delta functions for each salient peak; calculating an azimuth angle for each salient peak from the azimuth Interaural Time Differences; calculating an elevation Interaural Time Difference by cross correlating corresponding weighted Kronecker delta functions; calculating an elevation angle for each salient peak from the elevation Interaural Time Difference, constructing an auditory saliency map in azimuth-elevation coordinates by assigning the largest auditory sensor signal for each salient peak to a weighted distribution centered at the previously calculated azimuth and elevation with a standard deviation.

In ninth embodiment of the present invention, a method of fusing a visual saliency map with an auditory saliency map comprising: computing the visual saliency map in head centered coordinates from visual data; computing the auditory saliency map head centered coordinates from data generated by auditory sensors; combining the visual and auditory saliency map as a weighted linear combination of the visual saliency map and auditory saliency map.

In a tenth embodiment, the previously described method in the ninth embodiment of fusing saliency maps wherein the method of computing the visual saliency map uses object based segmentation.

In another embodiment, the previously described method in the ninth embodiment of fusing saliency maps wherein the method of computing the visual saliency map uses feature based segmentation.

In another embodiment, the previously described method in the ninth embodiment of fusing saliency maps wherein the method of computing the auditory saliency map comprises: computing a saliency map in frequency versus time coordinates from data generated by auditory sensors; determining the frequency and time band for each salient point of the saliency map; extracting a snippet of sound from each auditory sensor based on the frequency and time band; filtering the snippets of sound to remove echoes and noise; reducing each filtered snippet of sound into an onset envelope signal; converting the onset envelope to a series of weighted Kronecker delta functions; calculating an azimuth Interaural Time Difference by cross correlating corresponding weighted Kronecker Delta functions for each salient peak; calculating an azimuth angle for each salient peak from the azimuth Interaural Time Differences; calculating an elevation Interaural Time Difference by cross correlating corresponding weighted Kronecker Delta functions for each salient peak; calculating an elevation angle for each salient peak from the elevation Interaural Time Difference; constructing an auditory saliency map in azimuth-elevation coordinates by assigning the largest auditory sensor signal for each salient peak to a weighted distribution centered at the previously calculated azimuth and elevation with a standard deviation.

In a tenth embodiment, a process for fusing visual and auditory saliency maps, the process comprising: computing a first saliency map from data generated by visual sensors; computing a second saliency map in frequency versus time coordinates from data generated by auditory sensors; localizing the salient peaks in the second saliency map in azimuth and elevation; constructing an auditory saliency map in azimuth-elevation coordinates by assigning the largest auditory sensor signal for each salient peak in the second saliency map to a weighted distribution centered at the previously calculated azimuth and elevation with a standard deviation; fusing the first and auditory saliency maps as a weighted combination of each, then normalizing the fused saliency map.

In a further embodiment, the previously described tenth embodiment process for fusing visual and auditory saliency maps wherein the distribution is a Gaussian distribution.

In a further embodiment, the previously described tenth embodiment process for fusing visual and auditory saliency maps wherein the process for localizing the salient peaks in the second saliency map comprises a process of determining the frequency and time band for each salient point of the second saliency map; extracting a snippet of sound from each auditory sensor based on the frequency and time band; filtering the snippets of sound to remove echoes and noise; reducing each filtered snippet of sound into an onset envelope signal; converting the onset envelope to a series of weighted Kronecker delta functions; calculating an azimuth Interaural Time Difference by cross correlating corresponding weighted Kronecker Delta functions for each salient peak; calculating an azimuth angle for each salient peak from the azimuth Interaural Time Differences; calculating an elevation Interaural Time Difference by cross correlating corresponding weighted Kronecker delta functions for each salient peak; calculating an elevation angle for each salient peak from the elevation Interaural Time Difference.

In an eleventh embodiment, a computer program product, stored on a computer readable medium, for focusing a robot's attention on one or more salient objects, comprising means for receiving data from a left eye camera, a right eye camera, a left microphone, a right microphone; means for processing said data into a visual saliency map in azimuth and elevation coordinates and an auditory saliency map in frequency versus time coordinates; means for localizing sources of salient data in the auditory saliency map; means for mapping the auditory saliency map into azimuth and elevation coordinates; means for fusing the auditory saliency map with the visual saliency map into a combined saliency map of the one or more salient objects; means for commanding the robot to focus its attention serially on the salient objects in the combined saliency map.

In a further embodiment, the computer program product previously described in the eleventh embodiment wherein the means for localizing sources of salient data further comprises means for determining a frequency and time band for each salient peak of the second saliency map; means for extracting a snippet of sound from each auditory sensor based on the frequency and time band for each salient peak; means for filtering the snippets of sound to remove echoes and noise; means for reducing each filtered snippet of sound into an onset envelope signal; means for converting each onset envelope to a series of weighted Kronecker delta functions; means for calculating an azimuth Interaural Time Difference by cross correlating corresponding weighted Kronecker Delta functions for each salient peak; means for calculating an azimuth angle for each salient peak from the azimuth Interaural Time Differences; means for calculating an elevation Interaural Time Difference by cross correlating corresponding weighted Kronecker delta functions for each salient peak means for calculating an elevation angle for each salient peak from the elevation Interaural Time Difference.

DESCRIPTION OF THE DRAWINGS

The objects, features and advantages of the invention will be apparent from the following detailed description of the preferred embodiment of the invention in conjunction with reference to the following drawings where:

FIG. 1 shows the basic geometry of a robot. This is not meant to be limiting of the apparatus and method herein but a representation for the reader that relates the detailed description under the heading Robot Description to a physical device for ease of understanding.

FIG. 2 illustrates the computer for controlling the robot and executing the methods defined by this application.

FIG. 3 illustrates the relationship between the computer 200, the robot 100 and the target 130

FIG. 4 illustrates a computer program product embodying the methods defined by this application and containing the means described herein.

FIG. 5 shows an overview of the methods herein.

FIG. 6 shows the details of the Hierarchical Spatial Working Memory as detailed in "Hierarchical Spatial Representation for Multimodal Sensory Data"

FIG. 7 shows the steps in developing the visual saliency map.

FIG. 8 shows the steps in developing the auditory saliency map.

FIG. 9 shows a typical input sound recording from one microphone displayed in frequency versus time coordinates.

FIG. 10 shows the intermediate results a-c of processing the sound recording of FIG. 9 into an auditory saliency map of FIG. 10*d*.

FIG. 11 shows an enlarged view of FIG. 10*d*, the auditory saliency map.

FIG. 12A shows the processing of the auditory saliency map of FIG. 11 into locations of salient points.

FIG. 12B concludes the processing of the auditory saliency map into locations of salient points.

FIG. 13 shows the steps of fusing the visual and auditory saliency maps.

DESCRIPTION

This invention is directed to methods of fusing sensory data that facilitate robot control.

The following description is presented to enable one of ordinary skill in the art to make and use the invention and to incorporate it in the context of particular applications. Various modifications, as well as a variety of uses in different applications will be readily apparent to those skilled in the art, and general principles defined herein may be applied to a wide range of embodiments. Thus the invention is not intended to be limited to the embodiments presented, but is to be accorded the widest scope consistent with the principles and novel features disclosed herein.

In the following detailed description, numerous specific details are set forth in order to provide a more thorough understanding of the invention. However, it will be apparent to one skilled in the art that the invention may be practiced without necessarily being limited to specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All features disclosed in this specification, (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalents or similar features.

Any element in a claim that does not explicitly state "means for" performing a specified function, or "step for" performing a specific function, is not to be interpreted as a "means" or "step" clause as specified in 35 USC Section 112, Paragraph 6. In particular, the use of step of or act of in the claims herein is not intended to invoke the provisions of 35 USC Section 112 Paragraph 6.

The invention will be described with reference to the accompanying drawings. This invention may be embodied in many different forms and should not be construed as limited to the embodiments set forth herein. Further, the dimensions, materials and other elements shown in the accompanying drawings may be exaggerated to show details. The invention should not be construed as being limited to the dimensional or spatial relations or symmetry shown in the drawings, nor should the individual elements shown in the drawings be construed to be limited to the dimensions shown.

The drawings and accompanying descriptions are meant to provide the structure for the function performed by the components described in the drawings and accompanying descriptions.

GLOSSARY

BCC—body centered coordinates. The location of a target invariant to motions of the head or eyes bmap—mapping a position known in Head Centered Coordinates into Body Centered Coordinates. $bmap^{-1}$ is the mapping from Body Centered Coordinates to Head Centered Coordinates.

ECC—eye centered coordinates, the pixel coordinates of a target in a camera's view.

Foveate—To center a target in the field of view of each camera by pointing the cameras at the target.

HCC—head centered coordinates. The location of a target invariant to motion of the eyes. The head pan and tilt angles needed to point the head at the target.

hmap—mapping a position in Eye Centered Coordinates into Head Centered Coordinates. $hmap^{-1}$ is the mapping between Head Centered Coordinates and Eye Centered Coordinates.

HSWM—Hierarchical Spatial Working Memory. The set of target position representations that include eye, head and body coordinates LWPR—Locally weighted projection regression. A method for learning the mapping between an input and an output.

Saliency Map—A saliency map captures the relative priority various objects detectable by a system should have to meet the overall goals of the system, all as a function of some coordinate system (not necessarily spatial). Depending on the goals of the system a bright object may be more salient than a dim one and a loud object more salient than a bright one. Other goals may require the "red" object to have a greater saliency than a loud object. In the literature a saliency map is composed of the combination of a number of feature maps. Each feature map depicts a set of items that can be used to satisfy a goal and the combination of feature maps explicitly implements a priority scheme of the importance of the various features. Combining the various feature maps generates a saliency map.

Somatosensory—information derived from other than visual or auditory sensors, e.g. touch or rangefinders.

Target—item of interest in the field of view of the camera.

Verging—commanding the head and/or eyes such that the target is centered in each of two eyes. The vergence angle is the included angle between the gazes of each eye is a measure of the distance from the eyes to the target.

Robot Description 100

FIG. 1 illustrates the relationship between the eye cameras 120 and 140, the head 110, microphones 170, 175, 180 and 185 and the body represented by axes X 102, Y 103, and Z 104 of a typical robot 100.

The robot 100 is controlled by a computer 200 as shown in FIGS. 2 and 3. The structure, methods and programs implementing this invention can be embodied physically in many forms. FIG. 4 shows one non-limiting example of a compact disk embodying programs for controlling the robot 100. Alternate embodiments include implementation in the memory of general purpose computers, flash drives, and memory accessible over a computer network.

If the computer 200 issues a command 222 to the robot 100 to achieve a particular joint angle or sensor position, then the robot will achieve that commanded position without error.

Eyes

The eyes of a robot are usually cameras but may be other sensors. The eye cameras 120 & 140 generate pixels of the target 130 location in the field of view of the cameras 120 & 140. The target 130 location in the eye camera 120 & 140 frame can be represented as the horizontal and vertical pixel count. For purposes of this description, but without implying a limitation of the present invention, a target 130 centered in the eye cameras 120 & 140 gives zero pixel counts. Each eye camera 120 & 140 can pan 124 &144 and tilt 126 & 146, respectively, to point the eye camera 120 & 140 at the target 130. The pan 124 & 144 is the azimuth angle and the tilt 126 & 146 is the elevation angle. The pan and tilt angles 124, 144, 126, 146 may be sensor values or commands to achieve a desired pan or tilt angle.

A different camera system may give non zero pixel counts for targets centered in the field of view, which will require a change of reference to calculate a zero-zero centered target.

Microphones

The ears of a robot are usually microphones but may be other sensors. As shown in FIG. 1, microphones 170, 175, 180 and 185 may be arranged on the head such that pairs of microphone data may be processed into azimuth and elevation angles. The microphones measure sound intensity as a function of time.

Head

The head 110 of a typical robot may have independently gimbaled and controlled eye cameras 120 & 140. The eye cameras 120 & 140 are mounted in a plane that defines the head such that when the pan 124, 144 and tilt 126, 146 angles of the eye cameras 120 & 140 are zero each eye camera 120 & 140 is staring along a vector normal to the plane of the head. The head 110 itself may be gimbaled and controlled with respect to the body (102-104). The head 110 may rotate in azimuth $\theta_H$ 112 or pan and it may rotate in elevation or tilt $\Phi_H$ 114. The head pan and tilt angles 112, 114 may be sensor values or commands to achieve a desired pan or tilt angle 112, 114. When the head 110 is pointing at the target a vector originating at the mid point between the eye cameras 120 & 140 and ending at the target is normal to the plane of the head 110.

Body

The body of the robot (represented by axes 102, 103 and 104) may be considered to be the part that the head 110 is mounted on. The body may be stationary or not. For example, if the eyes 120, 140 are surveillance cameras mounted in a room, then the room is the body and the head 110 is fixed.

Eye Centered Coordinates

The Eye Centered Coordinates (ECC) of a target is the primary input to the representation hierarchy. A target is identified for example as shown in "Visual Attention and Object Recognition System" (application Ser. No. 11/973, 161 filed Oct. 4, 2007) in terms of its pixel location in a left and right eye camera image, $L_X$, $L_Y$, $R_X$, and $R_Y$ respectively. Without loss of generality, the pixel values are zero when a target is centered in the field of view of an eye. The x-y pixel coordinates in each image are combined to create a four-element vector, 610 in FIG. 6. This is considered a representation of the target location in eye-centered coordinates. In addition, the current pan and tilt angles of each eye are also saved as part of the Hierarchical Spatial Working Memory 600. As long as the system does not move, i.e. neither the eyes nor the head move, this is an accurate representation of the target location in space. As soon as either eye or the head moves, the prior pixel coordinates no longer correspond to the same location in space.

Head Centered Coordinates

The second level in the visual core hierarchy is Head Centered Coordinates (HCC), which are based on the positions of the eye cameras 120 & 140 required for the target location to be centered in both eye cameras 120 & 140. This representation is invariant to eye position, because, regardless of the current positions of the eye cameras 120 & 140, the HCC tells us how they would be positioned if the target was centered in the eye cameras 120 & 140. Let $\Theta_L$ and $\Theta_L$ be the left eye camera 140 pan 144 and tilt 146, respectively, while the target is centered, $L_X$, $L_Y$, $R_X$, $R_Y$=0 and let $\Theta_R$ and $\Phi_R$ be the right eye camera 120 pan 124 and tilt 126, respectively. HCC is a four element vector: H=⟨$_1$,$h_3$,$h_5$,$h_7$⟩. The elements $h_1$ and $h_3$ correspond to a head-centered, ego-centric pan 112 ($\Phi_H$) and tilt 114 ($\Phi_H$), respectively. They are computed as follows.

$$h_1 = \frac{\Theta_L + \Theta_R}{2}$$

$$h_3 = \frac{\Phi_L + \Phi_R}{2}$$

These approximate the pan 112 and tilt 114 angles respectively of a line coming out of the midpoint between the eye cameras 120 & 140 and going straight to the target 130. The eye camera 120 & 140 angles used in this calculation are those when the eye cameras 120 & 140 are looking directly at the target, i.e. the pixel values are zero. $h_1$ and $h_3$ will have the same meaning as the eye camera angles 124, 126, 144, 146 and with the same references, i.e., if $h_1$=0, the target is on a line originating half way between the eye cameras 120 & 140 and perpendicular to the head 110. While this makes up part of the information needed to represent the target's location, there are still infinitely many points on this line where the target 130 could reside. To represent the distance of the target from the robot, the HCC 630 is populated with a representation of the vergence angle. That is, the angle at which the central focus of the two eyes converge. Thus, $h_5$ and $h_7$ represent the horizontal and vertical vergence, respectively, and they are computed as follows.

$$h_5 = \frac{\Theta_L - \Theta_R}{2}$$

$$h_7 = \frac{\Phi_L - \Phi_R}{2}$$

The divisor in the equations for $h_1$, $h_3$, $h_5$ and $h_7$ is 2 because of the symmetry of the eye cameras 120 & 140 relative to the "nose" 102 of the head 110. Other locations of eye cameras 120 & 140 may result in the divisor being other than two. Hence in general, the components of HCC 630 are a fraction of the sum or difference of the eye camera 120 & 140 pan and tilt angles 124, 144, 126, 146 as appropriate for the geometry.

Hierarchical Spatial Working Memory (HSWM) for a Target

FIG. 6 shows a schematic of the hierarchical structure of the Hierarchical Spatial Working Memory 600 as it would be represented in a computer. Each target is represented by a set of Eye Centered Coordinates (ECC) 610, a set of Head Centered Coordinates (HCC) 630 and a set of Body Centered Coordinates (BCC) 650. In addition, the current position of the eye cameras 660 and head 670 are saved. A mapping function 620 is needed for converting ECC to HCC and another mapping 640 to convert HCC to BCC. Since only one mapping 620 is needed for ECC to HCC and another 640 from HCC to BCC, these mappings do not have to be saved with each target. One skilled in the art will appreciate that the various data elements do not have to be stored in contiguous memory as long as any program needing the data can access it. Moreover, a person skilled in the art will realize that alternative robot configurations and designs may call for more or fewer coordinate representations and mappings.

The Hierarchical Spatial Working Memory 600, shown in FIG. 6 is a visual core representation hierarchy that encodes the location of a target in space in multiple coordinate representations and in terms of a camera sensor's required commands or orientation such that the target is centered in the camera images. Given a target in the field of view of the eye cameras, the HSWM may be populated first with the current pixel values, then the eye cameras 120 & 140 are moved such that the pixel values are zero. The last pan 124, 144 and tilt 126, 146 angles become the arguments for the HCC. Alternatively, if the mappings from eye centered coordinates to head centered coordinates (hmap 620) and from head centered coordinates to body centered coordinates (bmap 640) are known then the target position in head and body centered coordinates may be computed from eye centered coordinates.

The HSWM 600 may be thought of as accommodating an active vision robot 100 with two independent eye cameras 120 & 140 on a movable head 110. The visual core of this multimodal hierarchy are the eye and head positions necessary to center a target 130 in the eye cameras 120 & 140. The head positions are those necessary to point the "nose" at the target. This is captured in the BCC 650.

Auditory Extensions to the Hierarchy

While the Hierarchical Spatial Working Memory 600 shown in FIG. 6 is constructed and interpreted in terms of visual inputs and commands required to visually center a target, it can be extended to incorporate auditory data from microphones acting as "ears". FIG. 1 shows the robot head with four microphones 170, 175, 180 and 185 acting as "ears". Microphones 170 and 175 can be used to determine the azimuth angle of a target from the difference in arrival times of the same noise signal. Likewise, the elevation angle of the noise source can be determined from the difference in arrival times of the same noise signal in microphones 180 and 185.

Integrating the microphones into the HSWM requires developing azimuth and elevation angles indicating the source of the auditory target comparable to the head pan 112 and tilt angles 114 indicating the source of the visual target Mapping from Eye Centered Coordinates to Head Centered Coordinates While the equations given above are sufficient to calculate the HCC 630 representation of a target 130 centered in the field of view of each eye camera 120, 140 of the robot 100, converting a visual saliency map from pixel space to HCC requires an ability to find the HCC 630 of each pixel in an eye camera 120, 140. hmap 620 provides the mapping to convert any target 130 in the field of view of the robot's eye cameras 120 & 140 or each pixel to HCC 630. Let $\hat{E}$ be the ECC 610 representation of the target or pixel, H is the HCC 630 representation of the currently foveated point, and $\hat{H}$ is the HCC representation of E to be computed. The mapping hmap 620 (head-centered map in FIG. 6) is used to compute the HCC 630 representation of the target or pixel.

$$\hat{H} = h\text{map}(\hat{E}) + H$$

hmap is learned through a training scenario or its equivalent. Once known, given hmap, a point with a known ECC, and HCC of the current foveated point, then each pixel in the field of view of a camera can be converted into equivalent HCC coordinates.

Generally, before the creation of a visual saliency map begins, the calibration of the mapping from ECC to HCC must be performed. While the determination of the mapping could occur after the saliency map is developed, it must be determined before the saliency map can be converted to HCC coordinates.

Visual Saliency Map

Humans can analyze a scene quickly and easily, effortlessly noticing objects, even those that the viewer has never seen before. "Noticing" the object is an example of computing the saliency of the object and can occur before the object is identified. As important, the saliency of the object depends on the system goals. Neurologically, saliency occurs as a front-end to perception, prior to conscious registration of the event. Having a computer process an image into the specific regions that are of highest interest in the context of system goals is computing the saliency map for the system. Implicit in this description is the concept that as the system goals change the saliency map may change. For example, if the system goal is to pick up a particular colored object then an object with a color that matches the desired color will have greater saliency than non-matching colors. Once the object is grasped then the goal may change to orient the object with respect to another. The color of the object no longer creates the greatest saliency. Instead, identification of particular shapes of the object to facilitate orientation becomes more important and the saliency computation is adjusted accordingly. Adjustments to saliency computation may be accomplished by weighting the various components of the saliency map.

Two main classes of saliency algorithms are feature-based and object-based algorithms. Feature-based methods, are described in [1-3]; they are well established and widely referenced. These references compute attention by constructing a saliency map from a set of biologically inspired features extracted from the image. The feature-based method breaks apart the image into a set of Gaussian pyramids corresponding to, for example, color, intensity, and orientation at a series of scales, which are combined across scales and features then merged into the saliency map. The system attends to the point that corresponds to the maximum value in the saliency map, executes some processing relevant to that location, and shifts to the next most salient point. However, this method does not give object boundaries, but only gives the most salient locations in the scene, which may or may not fall inside an object boundary. In order to overcome these limitations of feature-based methods, object-based methods have been proposed and developed [4,6]. An object-based visual saliency method that finds the most salient objects and their boundaries (or segmentation) has been described in "Visual Attention and Segmentation System" patent application Ser. No. 12/214, 259 filed 16 Jun. 2008. A visual saliency map generated using HRL's object-based attention algorithm would be similar to 520 in FIG. 5. This visual saliency map is in camera or eye-centered coordinate system (ECC).

As shown in FIG. 7, the visual saliency map is determined by first commanding the robot 100 to foveate on a known target for which the ECC and HCC are known 720. Without moving the eye cameras 120, 140, the computer 200 will store the image in the eye camera 120, step 730. Note that the reference to image is used without limitation in that the image could be in color, Black & White, infrared, millimeter wave or some other image as a function of pixel location. At this point the computer has an image stored in HCC coordinates. The saliency map is computed according to the method detailed in the following paragraphs.

FIG. 7 shows a schematic diagram of the bio-inspired attention and object segmentation system 700. The saliency calculation is comprised of the following modules and algorithms: feature extraction 742, feature edge detection 744, watershed computation 746, Figure-Ground separation 748, saliency calculation 749.

The feature extraction module 742 uses, for example, six features including two intensity channels, L and D (light and dark), and four fully-saturated color channels (red (R), green (G), blue (B), and yellow (Y)). The two intensity channels, L and D, are calculated from the input image by averaging the red (r), green (g), and blue (b) channels: L=(r+g+b)/3 and D=255−L. Four fully-saturated color channels are created (red (R), green (G), blue (B), and yellow (Y)) that yield zero-response to white, effectively separating the effects of the color and intensity channels:

$$R = r - \frac{(g+b)}{2},$$
$$G = g - \frac{(r+b)}{2},$$
$$B = b - \frac{(r+g)}{2}, \text{ and}$$
$$Y = \frac{(r+g)}{2} - \frac{|r-g|}{2} - b.$$

All negative values are thresholded at zero. Feature opponency maps corresponding to the receptive fields in the retina for red-center/green surround, green-center/red-surround, blue-center/yellow-surround, bright-center/dark-surround, and dark-center/bright-surround are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. Each opponent feature map is computed when the surround channel is subtracted from the center channel. This process is repeated for each center-surround channel pairing.

The feature edge detection module 744 computes the gradient information of each opponency map by convolving it with a filter (such as a Sobel filter), which extracts the edge information from each map. A master edge map, E, is computed by representing each pixel (x, y) by its maximum value across all of the edge maps in a winner-take-all fashion often exhibited by neural cells:

$E(x,y)=\max\{E_{RG}(x,y),E_{GR}(x,y),E_{BY}(x,y),E_{YB}(x,y),E_{LD}(x,y),E_{DL}(x,y)\}.$ The master edge map is processed by a watershed algorithm (i.e., watershed module 746), which completes the boundaries and closes the contours provided by the edge map and represents these regions as segmented proto-objects. According to research the phase differences between neighboring visual cortical neurons are believed to contribute to the segmentation of objects in a scene and perceptual grouping of "blobs." The watershed transform simulates these activities. Figure-ground separation is achieved by tagging those watershed regions that occupy a disproportionately large region of the image space as "background" and all others as foreground proto-objects. Segmented proto-objects that only occupy a small fraction of the scene (e.g., <2%) are discounted as noise.

Once the scene has been segmented into a grouping of proto-objects, the saliency calculation 749 follows, in which the saliency of each is computed and ranked relative to the other proto-objects in the image. For any given proto-object, the local neighborhood is represented by a rectangular bounding box surrounding the object whose area is three times larger than the object. The bottom-up saliency ($S_{BU}$) of a given proto-object is defined as:

$$S_{BU} = \sqrt{\sum_i (\Delta FEAT_i)^2},$$

where the contrast term $\Delta FEAT_i$ for the $i^{th}$ feature is computed as the difference between the average feature value within the object boundary and the average feature value of the object surround:

$$\Delta FEAT_i = \max\left(w_i\left(\langle FEAT_i\rangle_{object} - \langle FEAT_i\rangle_{surround}\right), 0\right).$$

The angle brackets indicate the average operator over the pixels within the indicated region. Therefore, $\langle FEAT_i\rangle$ is the average value of the feature collected (e.g. average pixel value of the red-center/green surround channels) within the boundary of the proto-object or the surrounding area. The value of w determines the weight of the $i^{th}$ feature and is the principle component of the top-down biasing mechanism of the system. Each object can only be attended to once, which has the same effect as an inhibition of return mechanism applied to the most salient object.

Finally, given the saliency map in ECC coordinates, map each pixel to HCC coordinates 760 using the hmap conversion from pixels to HCC determined separately. The result is the visual saliency map converted into HCC coordinates of azimuth 112 and elevation 114.

Auditory Saliency Map
FTC Coordinates

FIG. 9 shows an example spectrogram from a microphone 170, 175, 180 or 185. The plot is intensity versus frequency and time. Any one of the recorded auditory signals could yield such a spectrogram but all four are needed to generate a map in HCC coordinates because all four are needed to localize sound sources.

See FIG. 8 which shows the method for computing the auditory saliency map. This method is analogous to the visual saliency map in "Visual Attention and Segmentation System" 12/214,259 filed Jun. 16, 2008. The first step 810 is recording the microphone outputs and selecting one for processing into a saliency map. The recording is of signal amplitude (loudness) versus time. Next, in step 820, windows of auditory data in the time domain are converted into the frequency domain with a short-time Fourier transform (STFT). Each window is centered at a time step. The result is auditory intensity versus frequency and time (i.e., a spectrogram) in Frequency versus Time coordinates (FTC). The spectrogram is used as the input to the method that creates the auditory saliency map.

In step 830 the segregation of individual features based on spectral or temporal modulation is accomplished by determining three conspicuity maps from the frequency versus time spectrogram corresponding to sound intensity, frequency contrast, and temporal contrast. Each conspicuity map is the normalized result of a two dimensional convolution of the FTC spectrogram with a filter. The filter for the intensity conspicuity map is a single Gaussian filter that emphasizes loud noises and smoothes the FTC spectrogram. The frequency conspicuity map uses a filter with a strong positive Gaussian filter in the pass band region and two negative Gaussian filters on either side of the pass band, one for the lower frequency sideband and the other for the upper frequency sideband. The filter for the temporal conspicuity map uses a strong positive Gaussian filter centered at a slightly greater time than the desired overall center time and another weaker negative Gaussian filter centered at a lower time then the overall center time. Normalization employs an asymmetric sliding window that rectifies and thresholds each conspicuity map to a value between zero and one. Example conspicuity maps are shown in FIG. 10 a-c.

Finally, the individual conspicuity maps are linearly combined and normalized. The resulting map is saliency in frequency-time coordinate system (FTC). Without loss of generality, individually weighted conspicuity maps may be combined where the weights reflect the system goals. An example saliency map is shown in FIG. 10d and the same, enlarged saliency map is shown in FIG. 11.

Segment Auditory Data to Localize Sources in Frequency Versus Time

Auditory stimuli of interest are segmented within the auditory saliency map using a rectangular window centered at a saliency peak, with the boundaries of the rectangle chosen in each direction such that saliency values greater than 90 to 95% of the peak are included or a saddle point between adjacent peaks is reached. This segmentation defines a start and stop time and a start and stop frequency for each salient point. The start and stop times may be reduced and increased respectively by the expected maximum interaural time difference. The start and stop times can be used to extract the salient sound snippets from the original auditory stream at each microphone for further processing. The snippet of the auditory stream extracted from the recording based on the start and stop times is further filtered in the frequency domain based on the start and stop values of the frequency band. Depending on the bandwidth of the salient region, these snippets can be subjected to further processing and filtering to eliminate the noise at uninteresting frequencies. Further processing to ensure a clean signal may be a useful additional step to accurate localization of a sound. In addition, if two salient sounds at different frequencies occur simultaneously then they must be filtered and split into separate signals prior to localization to ensure accurate determination of their sources.

Segmentation of two simultaneous sound sources is accomplished by first assuming the two sources are of different frequencies. If the two sound sources overlap in time and frequency then the method herein will treat the two or more sources as one. Furthermore, if the two sound sources are distinct in time then the segmentation method based on a rectangular window centered at the peak in the saliency map will suffice. If the two sound sources overlap in time but are distinct in frequency then the windowing method will identify the start and stop times, and the upper and lower frequency of each peak. Once the start and stop times and the frequency boundaries of the peaks are known, the microphone signals can be processed to extract the particular time window, which can then be further filtered with a band pass filter whose frequency boundaries correspond to the lower and upper frequencies of the window centered on the salient peaks.

Although the auditory saliency map is computed from one microphone's signal, the time and frequency windows are applicable to each microphone's 170, 175, 180 and 185 recorded signal. Each of the four microphone signals is segmented into snippets of the auditory signal with common time and frequency bands 1210. Each set of snippets for a given time and frequency band or salient point can be processed for the location of the sound source per the method shown in FIGS. 12A and 12B.

The auditory saliency map indicates frequencies and timeframes that might be of particular interest to the robot. However, the saliency information alone is not particularly useful for pinpointing the location of its origin. Rather, the saliency information is combined with information provided by the microphone array to localize the source of the sound and convert its saliency into the HCC or BCC coordinate system. This requires that the source of the sound be localized relative to the robot. FIGS. 12A and 12B show the method of localizing the sound source.

Localization

The location of the source of the sound is determined by computing the interaural time difference (ITD) between two microphones for a pair of snippets of the auditory signal identified in the segmentation method above. The upper and lower microphones' 180, 185 recorded auditory snippets are used to compute the elevation. The left and right microphone 170, 175 recorded auditory signals are used to compute the azimuth. Research has shown that this method is best employed for mid to high frequency sounds above 500 Hz [7]. First, the four auditory signals are filtered in time and frequency per step 1220 for each saliency identified in 1210. The result is four snippets of sound for each salient point in 1210. Next, the auditory snippets are filtered to remove echoes, various noise sources, and other anomalies in step 1230. Next, it is useful to decimate the auditory signal at each microphone into a rectified series of weighted Kronecker delta functions that correspond to amplitude increases in the signal envelope (at each of the so-called "onsets" of sound [8]). Rectified as used here means negative values are discarded. In FIG. 12A this is step 1240 and 1250. An important element in the process step 1250 is inhibiting the occurrence of a Kronecker delta function until approximately 10 milliseconds have elapsed from the occurrence of the immediately preceding Kronecker delta function. This feature mimics the performance of the human brain which filters out echoes from loud signals by waiting some time after a loud signal before considering the next. From the series of Kronecker delta functions or onset signals, one can compute the ITD and the corresponding azimuth angle 112 in step 1260 by cross correlating pairs of onset signals. The cross-correlation function indicates how far apart two signals are shifted in time. The ITD is the time corresponding to the largest peak from the cross-correlation between the left and right microphones 170, 175 series of Kronecker delta functions or onset signals. The azimuth of the sound source can be computed by solving 1a or 1b, in step 1280 depending on the configuration of the ears relative to the head. The elevation angle is computed similarly in steps 1270, 1280.

$$ITD = \frac{d}{2S}\sin(\theta) \qquad 1a$$

$$ITD = \frac{d}{2S}(\theta + \sin(\theta)) \qquad 1b$$

for θ (in radians), where S represents the speed of sound (344 m/s), and d corresponds to the linear distance (in meters) between the microphones 170 and 175, or 180, 185 [9]. Equation 1a is for the head in FIG. 1 where the microphones 170, 175, 180 and 185 are in the same plane as the eye cameras

120, 140. Equation 1b is used where the head has a spherical shape of radius d/2. The elevation angle 114 may be computed by solving the above equation for 0, where the ITD is determined from the upper and lower microphone 180, 185 recorded auditory snippets. This information is used to produce a map in HCC that indicates the azimuth 112 and elevation 114 angles required to point the head 110 of the robot 100 at the location of the origin of the sound.

Ideally, the cross-correlation function will return a single, sharp peak. However, due to various sources of noise, this function will often return a series of peaks, which correspond to the relative confidences that the sound originated at a given location. The origin of the sound is identified as follows. If the cross correlation has one major peak then the time of occurrence of that peak is the ITD. A major peak is one with an amplitude greater than a user defined multiple of any other peak in the cross correlation. Typically the major peak has an amplitude more than twice that of the next largest peak. Given the ITD of the major peak, one can identify the source of the sound as the source that occurs earliest, providing that source is loudest. However, if the cross correlation contains two or more distinct peaks then one of the peaks may be an echo or the result of noise within the pass band. Anomalies such as these are detected and ignored by comparing the amplitudes and timings of the first onset from each microphone. If the amplitude of the first onset is larger in the microphone that first recorded the onset sound, then the range of possible angles for the origination of the sound is constrained to that side. Otherwise, the auditory snippet with the larger amplitude at the time of the largest peak is selected as being the recording of the original sound.

In instances where there is only a two microphone array then some simplifications are necessary. A two-microphone array (170, 175 for example) cannot simultaneously detect both the azimuth and elevation of the location of a sound source. In these instances, there will always be a certain degree of uncertainty associated with the missing coordinate; for example if microphones 180, 185 are absent then it is useful to assume that the most likely elevation of the sound is at eye level (elevation equals zero), with a certain degree of uncertainty in this dimension that decreases as the tilt tends away from its zero value. The azimuth values in this map along zero elevation are determined from the peak times from the cross-correlation between the right and left microphones 170, 175.

Once the source (azimuth and elevation) of each segmented peak in the auditory saliency map has been determined, one can use this information to transform the saliency map from the frequency-time coordinate system into an auditory HCC saliency map that combines the saliency and localization information. This is performed by placing a Gaussian peak in the HCC coordinate space (azimuth 112 and elevation 114) at the location of each peak in the saliency map per step 1290 of FIG. 12B. Each of these Gaussians is given the height of the corresponding peak in the frequency-time saliency map. This ensures that the locations corresponding to salient noises will be attended to with a higher preference than sounds with low saliency, as long as the sounds occur within the same time frame. The new HCC auditory saliency map is normalized to the range between zero and one and is then forwarded to the multimodal fusion stage per step 1295.

Fusing Saliency Maps

Once the mappings for auditory and visual saliency have been transformed into a common coordinate system (HCC) 1310, as shown in FIG. 13 which describes the locations of interest at a given time, they must be combined into a fused saliency map which balances the robot's attention between objects that "stand out" in a visual scene with sounds that attract interest. This process is carried out using a weighted linear combination of the visual and the auditory HCC saliency maps as shown in FIG. 13. The weighted maps are added on a point-by-point basis 1320, and the final saliency map is normalized to the range between zero and one 1330. At this stage, the final map represents the HCC coordinates of salient regions for both visual and auditory stimuli, and allows the robot to fixate its attention on the most salient object in its environment. The most salient objects in the environment depends on the weights assigned to the various components of the saliency map as well as the weights used in the final fusing. These weights are not constant and may vary with the goals of the control method at a particular time.

In the event a component saliency map has an object outside the scope of the other saliency map, the boundaries of the fused saliency map are increased to span the boundaries of all component maps. The saliency of a component map beyond its boundaries is zero. For example, if the sound source is outside the field of view of the eye cameras 120, 140 then the fused saliency map will comprise a saliency at the location of the sound source where the saliency is dependent on the sound source only, the visual saliency makes no contribution at that point. It may occur that a robot commanded to attend to the most salient point will move its head to focus on a loud object, which will bring the sound source within the field of view of the eye cameras 120, 140, before focusing on a bright or colorful object.

Commanding the Robot to Focus on a Salient Point

Given the combined, fused saliency map in azimuth 112 and elevation 114 coordinates, select the azimuth and elevation coordinates of the largest/most salient point. Generate commands to the robot 100 to point the head 110 at the salient point. This is accomplished by the robot 100 issuing the selected azimuth 112 and elevation 114 angles as commands 222.

What is claimed is:

1. A computer program product for computing a fused saliency map derived from visual and auditory sensors, the computer program product comprising a non-transitory computer-readable medium having computer program instructions stored therein for causing at least one computer to perform operations of:
   computing a first saliency map from data generated by visual sensors;
   computing a second saliency map in frequency versus time coordinates from data generated by auditory sensors;
   localizing one or more salient peaks in the second saliency map in azimuth and elevation;
   constructing an auditory saliency map in azimuth-elevation coordinates by assigning the largest auditory sensor signal for each salient peak in the second saliency map to a weighted distribution centered at the previously localized azimuth and elevation with a standard deviation;
   fusing the first and auditory saliency maps as a weighted combination of each, into a fused saliency map, then normalizing the fused saliency map.

2. The computer program product of claim 1 having computer program instructions stored therein for causing the at least one computer to perform localization operations of:
   determining a frequency and time band for each salient peak of the second saliency map;
   extracting a snippet of sound from each auditory sensor based on the frequency and time band for each salient peak;
   filtering the snippets of sound to remove echoes and noise;

reducing each filtered snippet of sound into an onset envelope signal;
converting each onset envelope to a series of weighted Kronecker delta functions;
calculating an azimuth Interaural Time Difference by cross correlating corresponding weighted Kronecker Delta functions for each salient peak;
calculating an azimuth angle for each salient peak from the azimuth Interaural Time Differences;
calculating an elevation Interaural Time Difference by cross correlating corresponding weighted Kronecker delta functions for each salient peak
calculating an elevation angle for each salient peak from the elevation Interaural Time Difference.

3. The computer program product of claim 1 wherein the weighted distribution is a Gaussian distribution.

4. A computer program product for computing an auditory saliency map in spatial coordinates from auditory sensor data obtained from auditory sensors, the computer program product comprising a non-transitory computer-readable medium having computer program instructions stored therein for causing at least one computer to perform operations of:
computing a first saliency map in frequency versus time coordinates from data generated by the auditory sensors;
localizing one or more salient peaks in the first saliency map in azimuth and elevation;
constructing an auditory saliency map in azimuth-elevation coordinates by assigning the largest auditory sensor signal for each salient peak centered at the previously localized azimuth and elevation coordinates to a Gaussian distribution with a standard deviation;
normalizing the auditory saliency map.

5. The computer program product of claim 4 having computer program instructions stored therein for localizing one or more salient peaks wherein the localization comprises instructions for:
determining a frequency and time band for each of one or more salient peak of the first saliency map;
extracting a snippet of sound from each auditory sensor based on the frequency and time band for each salient peak;
filtering the snippets of sound to remove echoes and noise;
reducing each filtered snippet of sound into an onset envelope signal;
converting the onset envelope to a series of weighted Kronecker delta functions for each salient peak;
calculating an azimuth Interaural Time Difference by cross correlating corresponding weighted Kronecker Delta functions for each snippet of sound;
calculating an azimuth angle for each salient peak from the azimuth Interaural Time Differences;
calculating an elevation Interaural Time Difference by cross correlating corresponding weighted Kronecker delta functions for each salient peak;
calculating an elevation angle for each salient peak from the elevation Interaural Time Difference.

6. A system for robot control comprising:
a first eye camera, a second eye camera, at least a left auditory sensor and a right auditory sensor, all mounted on a robot head and all providing data to at least one computer;
wherein the robot head has a head centered coordinate system;
the at least one computer programmed to execute instructions stored on a computer readable medium for causing the computer to perform operations of:
receive said first eye camera, second eye camera, left and right auditory sensors, data; and
compute a visual saliency map from the first eye camera and second eye camera data in the head centered coordinate system;
compute an auditory saliency map in head centered coordinates from at least the left and right auditory sensor data;
fuse the visual and auditory saliency maps according to a weighting function.

7. The system for robot control of claim 6 wherein the computer readable medium further comprises instructions therein for causing the computer to command the robot head to focus on salient objects as determined by computer program inputs.

8. The system for robot control of claim 6 wherein the computer readable medium further comprises instructions stored therein for causing the computer to compute the auditory saliency map by performing operations of:
computing a second saliency map in frequency versus time coordinates from data generated by said auditory sensors;
determining a frequency and time band for each salient point of the second saliency map;
extracting a snippet of sound from each auditory sensor based on the frequency and time band for each salient peak;
filtering the snippets of sound to remove echoes and noise;
reducing each filtered snippet of sound into an onset envelope signal;
converting the onset envelope to a series of weighted Kronecker delta functions;
calculating an azimuth Interaural Time Difference by cross correlating corresponding weighted Kronecker delta functions for each salient peak;
calculating an azimuth angle for each salient peak from the azimuth Interaural Time Differences;
calculating an elevation Interaural Time Difference by cross correlating corresponding weighted Kronecker delta functions;
calculating an elevation angle for each salient peak from the elevation Interaural Time Difference;
constructing an auditory saliency map in azimuth-elevation coordinates by assigning the largest auditory sensor signal for each salient peak to a weighted distribution centered at the previously calculated azimuth and elevation with a standard deviation.

9. A method of fusing a visual saliency map with an auditory saliency map comprising:
computing the visual saliency map in head centered coordinates from visual data;
computing the auditory saliency map in head centered coordinates from data generated by auditory sensors;
combining the visual and auditory saliency map as a weighted linear combination of the visual saliency map and auditory saliency map.

10. The method of claim 9 wherein the method of computing the visual saliency map uses object based segmentation.

11. The method of claim 9 wherein the method of computing the visual saliency map uses feature based segmentation.

12. The method of claim 9 wherein the method of computing the auditory saliency map comprises:
computing a saliency map in frequency versus time coordinates from data generated by auditory sensors;
determining the frequency and time band for each salient point of the saliency map;

extracting a snippet of sound from each auditory sensor based on the frequency and time band;
filtering the snippets of sound to remove echoes and noise;
reducing each filtered snippet of sound into an onset envelope signal;
converting the onset envelope to a series of weighted Kronecker delta functions;
calculating an azimuth Interaural Time Difference by cross correlating corresponding weighted Kronecker Delta functions for each salient peak;
calculating an azimuth angle for each salient peak from the azimuth Interaural Time Differences;
calculating an elevation Interaural Time Difference by cross correlating corresponding weighted Kronecker Delta functions for each salient peak;
calculating an elevation angle for each salient peak from the elevation Interaural Time Difference;
constructing an auditory saliency map in azimuth-elevation coordinates by assigning the largest auditory sensor signal for each salient peak to a weighted distribution centered at the previously calculated azimuth and elevation with a standard deviation.

13. At least one computer programmed to execute a process for fusing visual and auditory saliency maps, the process comprising:
computing a first saliency map from data generated by visual sensors;
computing a second saliency map in frequency versus time coordinates from data generated by auditory sensors;
localizing the salient peaks in the second saliency map in azimuth and elevation;
constructing an auditory saliency map in azimuth-elevation coordinates by assigning the largest auditory sensor signal for each salient peak in the second saliency map to a weighted distribution centered at the previously localized azimuth and elevation with a standard deviation;
fusing the first and auditory saliency maps as a weighted combination of each, then normalizing the fused saliency map.

14. The at least one computer programmed to execute a process of claim 13 wherein the weighted distribution is a Gaussian distribution.

15. The at least one computer programmed to execute a process of claim 13 wherein localizing the salient peaks in azimuth and elevation comprises:
determining the frequency and time band for each salient point of the second saliency map;
extracting a snippet of sound from each auditory sensor based on the frequency and time band;
filtering the snippets of sound to remove echoes and noise;
reducing each filtered snippet of sound into an onset envelope signal;
converting the onset envelope to a series of weighted Kronecker delta functions;
calculating an azimuth Interaural Time Difference by cross correlating corresponding weighted Kronecker Delta functions for each salient peak;
calculating an azimuth angle for each salient peak from the azimuth Interaural Time Differences;
calculating an elevation Interaural Time Difference by cross correlating corresponding weighted Kronecker delta functions for each salient peak;
calculating an elevation angle for each salient peak from the elevation Interaural Time Difference.

16. An apparatus for focusing a robot's attention on one or more salient objects, the apparatus comprising:
means for receiving data from a left eye camera, a right eye camera, a left microphone, a right microphone;
means for processing said data into a visual saliency map in azimuth and elevation coordinates and an auditory saliency map in frequency versus time coordinates;
means for localizing sources of salient data in the auditory saliency map;
means for mapping the auditory saliency map into azimuth and elevation coordinates;
means for fusing the auditory saliency map with the visual saliency map into a combined saliency map of the one or more salient objects;
means for commanding the robot to focus its attention serially on the salient objects in the combined saliency map.

17. The apparatus of claim 16 wherein the means for localizing sources of salient data further comprises:
means for determining a frequency and time band for each salient peak of the second saliency map;
means for extracting a snippet of sound from each auditory sensor based on the frequency and time band for each salient peak;
means for filtering the snippets of sound to remove echoes and noise;
means for reducing each filtered snippet of sound into an onset envelope signal;
means for converting each onset envelope to a series of weighted Kronecker delta functions;
means for calculating an azimuth Interaural Time Difference by cross correlating corresponding weighted Kronecker Delta functions for each salient peak;
means for calculating an azimuth angle for each salient peak from the azimuth Interaural Time Differences;
means for calculating an elevation Interaural Time Difference by cross correlating corresponding weighted Kronecker delta functions for each salient peak
means for calculating an elevation angle for each salient peak from the elevation Interaural Time Difference.

* * * * *